United States Patent [19]

Norris et al.

[11] 4,198,120
[45] Apr. 15, 1980

[54] FIBER OPTIC DEVICE FOR CORRECTING IMAGE TILT OR CURVATURE IN A SPECTROGRAM

[75] Inventors: David D. Norris, San Gariel; Charles E. Giffin, Pasadena, both of Calif.

[73] Assignee: California Institute of Technology, Pasadena, Calif.

[21] Appl. No.: 918,373

[22] Filed: Jun. 23, 1978

[51] Int. Cl.² ............................ G02B 5/17; G01J 3/00
[52] U.S. Cl. ................................ 350/96.25; 356/303; 356/305; 356/328
[58] Field of Search ...................... 350/96.25; 356/302, 356/303, 305, 326, 328; 250/227

[56] References Cited

U.S. PATENT DOCUMENTS

| | | | |
|---|---|---|---|
| 3,473,872 | 10/1969 | Okamura | 350/96.25 |
| 3,535,537 | 10/1977 | Powell | 250/227 |
| 3,880,523 | 4/1975 | Thomas | 356/328 |
| 3,955,084 | 5/1976 | Giffin | 250/281 |

OTHER PUBLICATIONS

NASA Tech briefs, "Multichannel Spectroscopy Guide" *Optical Spectra*, Apr. 1970, p. 69.

*Primary Examiner*—Stewart J. Levy
*Attorney, Agent, or Firm*—Freilich, Hornbaker, Wasserman, Rosen & Fernandez

[57] ABSTRACT

A fiber optic device consists of bundles of fiber optic rods which extend from an input face of the device, to which images of a spectrogram are directed to an output face. The input and output faces of the bundles are corrected so that images of a spectrogram, which are either tilted with respect to the spectrogram's height axis or are curved due to Berry curvature, pass through the device and appear at its output face in directions perpendicular to the spectrograms length axis and parallel to its height.

5 Claims, 6 Drawing Figures

FIBER OPTIC DEVICE FOR CORRECTING IMAGE TILT OR CURVATURE IN A SPECTROGRAM

ORIGIN OF THE INVENTION

The invention described herein was made in the course of work under a grant from National Institute of Health.

BACKGROUND OF THE INVENTION

1. Field of the Invention

The present invention is generally directed to spectrogram processing means and, more particularly, to means for correcting image tilt or curvature in a spectrogram.

2. Description of the Prior Art

Various known devices produce spectrograms. One type of a spectrogram is one consisting of a plurality of parallel images, in the shape of parallel lines. For example, in a mass spectrometer (MS) the spectrogram is formed on a detector, e.g. a photoplate, simultaneously impingable and exposed by different ion beams. These beams expose the photoplate along parallel lines which are perpendicular to the center line, lengthwise through the spectrogram.

Although the images of the spectrogram on such a photoplate are perpendicular to the center line, lengthwise through the spectrogram, the use of a photoplate as a detector has significant disadvantages, which are discussed in U.S. Pat. No. 3,955,084, hereafter referred to as patent '084. Therein, an electro-optical detector, for use in a wide mass range mass spectrometer is described. Briefly, the function of the electro-optical detector is to replace the photoplate, as the detector, and to produce an optical spectrogram, consisting of a plurality of parallel light images.

In one embodiment of the electro-optical detector light images are produced on a light-sensitive plate 40. These images are designated by numerals 56 and 57 and are shown in FIG. 6 of patent '084. These light images are described, as being transferrable by optical fibers or rods 42 (FIG. 1) to a target 45 of a vidicon camera 46 for processing. Although the electro-optical detector, described in patent '084 overcomes most of the disadvantages of a photoplate-type detector, on which a spectrogram is produced, it exhibits one possible disadvantage, which prevents its output, i.e., the light images, from being fed directly for processing by commercially-available solid-state imaging devices, without some loss in resolution.

The light images, such as 56 and 57, though parallel to one another, are slanted or tilted, rather than being perpendicular, to the center line lengthwise through the spectrogram. This characteristic is typical of the light images produced by most known electro-optical ion detectors of mass spectrometers. Since all commercially-available solid-state imaging devices are in an orthogonal geometry, tilted images of a spectrogram are not compatible with them, unless a significant loss in resolution can be tolerated, which is clearly undesirable. The cost of developing a special-purpose solid-state imaging device capable of processing a spectrogram with tilted images has been found to be extremely high. Similar problems present themselves when attempting to process images of a spectrogram which are characterized by Berry curvature. A need therefore exists for simple means for correcting image tilt or image curvature in a spectrogram.

OBJECTS AND SUMMARY OF THE INVENTION

It is a primary object of the present invention to provide means for correcting the image tilt or curvature in a spectrogram.

Another object of the invention is to provide an arrangement, including a solid-state imaging device with orthogonal geometry, for processing tilted or curved light images of a spectrogram.

A further object of the present invention is to provide a relatively inexpensive and simple means for correcting light image tilt or curvature in a spectrogram and providing an output spectrogram, in which the light images are perpendicular to the center line lengthwise through the spectrogram, so that they can be processed by a conventional solid-state imaging device with orthogonal geometry.

These and other objects of the invention are achieved by a fiber optics device, consisting of several fiber optics bundles which are secured together, so that their output faces which form the device's output face, have an orthogonal geometry, while their input faces are formed through an angle, corresponding to the tilt angle of the spectrogram's images.

The novel features of the invention are set forth with particularity in the appended claims. The invention will best be understood from the following description when read in conjunction with the accompanying drawings.

BRIEF DESCRIPTION OF THE DRAWINGS

FIGS. 4 and 5 are isometric views of another embodiment of the invention; and

DETAILED DESCRIPTION OF PREFERRED EMBODIMENTS

Figure 1:
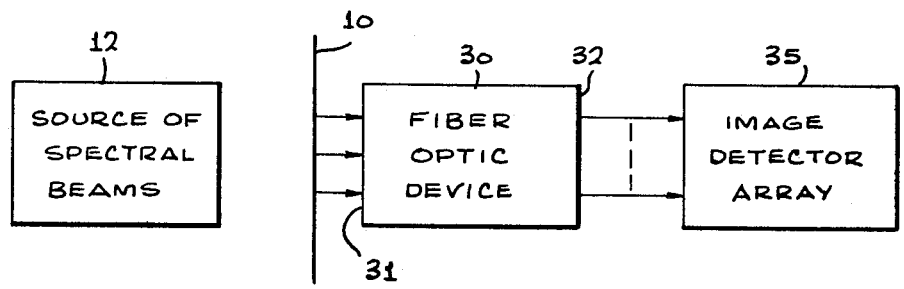
FIG. 1 is a simplified block diagram of the invention.

The invention will first be described in connection with image tilt correction. Attention is first directed to FIG. 1 which is a simplified block diagram, wherein numeral 10 designates an element, e.g., a light-sensitive plate, on which a spectrogram of tilted light images is assumed to be formed. Such a spectrogram may be formed by exposing plate 10 to beams, e.g., electron beams from a source 12. The latter may be a microchannel electron multiplier array or simply an MCA, such as the MCA 30, shown in patent '084 and plate 10 may be assumed to correspond to phosphorous plate 40 in said patent. The spectrogram's light images are in the shape of lines and therefore hereafter they may be referred to as images or simply lines.

In accordance with the present invention a fiber optic device 30 is positioned between plate 10 and an imaging device 35, which is ascertained to be characterized by an array of light sensitive elements, arranged in an orthogonal geometry. The device 30 and and imaging device 35 are oriented with respect to the orthogonal axes of plate 10 so that the tilted lines on plate 10 impinge device 35 parallel to one of its axes and perpendicular to the other axis.

Figure 2:
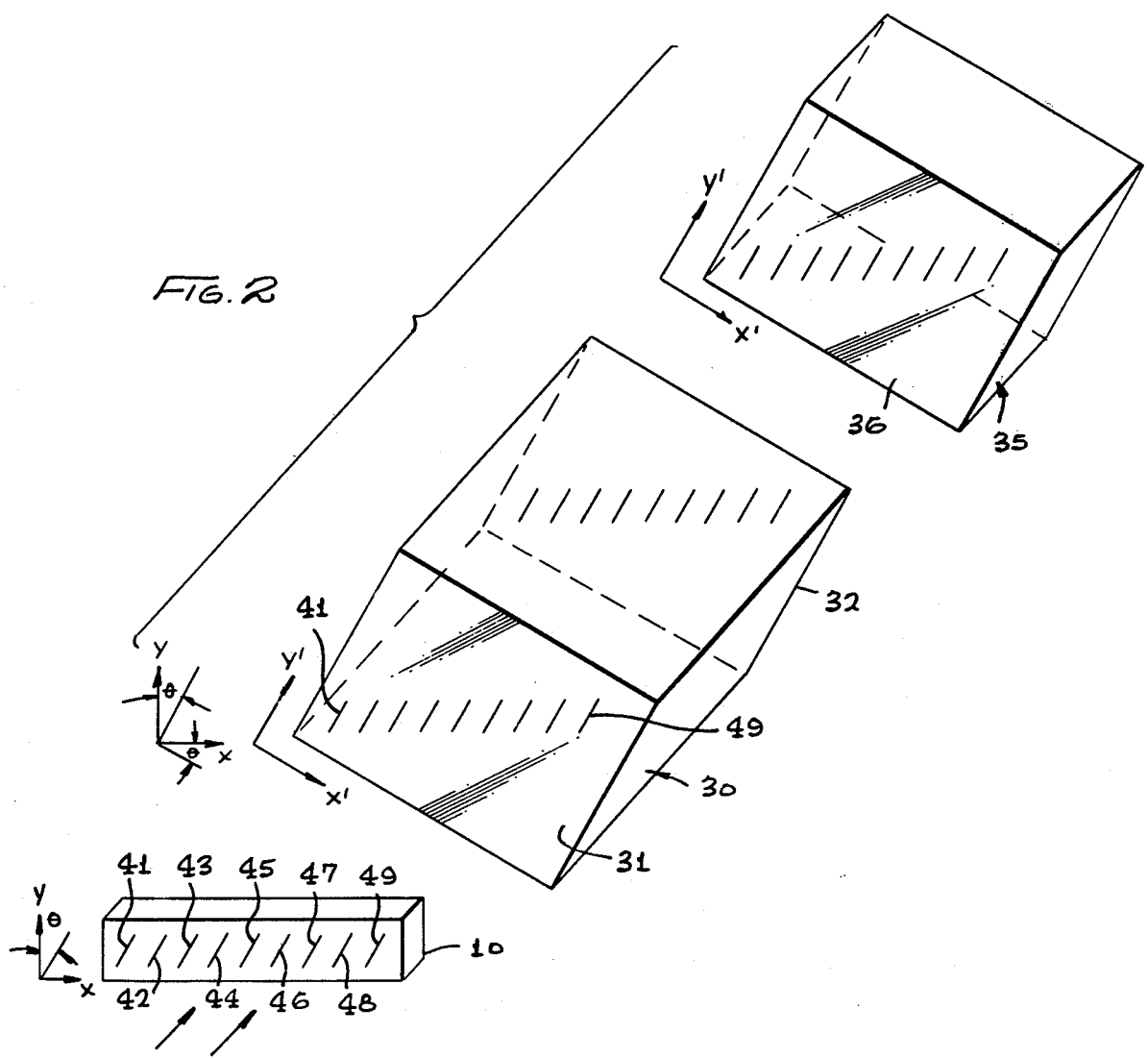
FIGS. 2 and 3 are isometric views of embodiments of the invention.

Attenuation is now directed to FIG. 2 wherein the plate 10 is shown in isometric view, as viewed from the side of the source 12. In FIG. 2 numerals 41-49 designate the spectrogram's images or lines which are assumed to have impinged or formed on the plate 10. These images correspond to the images, represented by line 56 and 57 in FIG. 6 of said '084 patent. In plate 10, which is shown with a rectangular cross-section, extending along orthogonal axes X and Y the lines 41-49, rather than being perpendicular to the spectrogram's center-line, extending lengthwise along the spectrogram axis X, are slanted. They are assumed to form an angle $\theta$ with respect to the perpendicular axis Y.

In accordance with the present invention the fiber optic device 30, which is in the path of the image lines from plate 10 is positioned, so that it extends lengthwise along an axis, X' and heightwise along an axis Y', which are respectively tilted with respect to axes X and Y by the angle $\theta$. Thus lines 41-49 impinge the input face 31 of fiber optic device 30 perpendicular to axis X' and parallel to height axis Y'.

From FIG. 2 it should be appreciated that on the tilted device 30 the lines 41-49, though parallel to height axis Y', are spaced apart along a line which is at the tilt angle $\theta$ with respect to the length axis X'. Consequently device 30 has to be of a height substantially greater than that of lines 41-49. In fact, the height of device 30 is a function of the spectrogram's length and angle $\theta$, in addition to the actual height of lines 41-49, to insure that all the spectrogram's lines impinge on its input face 31.

The light images (lines) 41-49 propogate through the fiber rods of device 30 from the input face 31 to the output face 32. Therefrom they pass and impinge on the light sensitive surface 36 of imaging device 35. The latter, like device 30, is tilted so that its orthogonal axes are parallel to axes X' and Y'. Thus, the lines impinge surface 36 in a direction parallel to axis Y' and perpendicular to axis X'. Clearly the active surface 36 like input face 31 of device 30, has to be of sufficient height to accomodate all the lines thereon. Although by tilting the devices 30 and 35, as shown in FIG. 2, the lines 41-49 are easily processable by device 35 with its active cells in the orthogonal geometry, (X' Y'), requiring such a device 35 of considerable height increases its cost.

This disadvantage is eliminated by a preferred embodiment of the present invention which will be described in connection with FIG. 3, the latter is similar to FIG. 2 and therein numerals, like those used herebefore designate like elements. The fiber optic device 30 instead of being formed of one block of fiber rods is formed of plurality of fiber optic bundles, e.g. three bundles designated A, B and C. The bottom edges 51 of input faces 31A, 31B and 31C rather than being aligned along a single line, are aligned along parallel lines, each being parallel to axis X'. Thus, the bundles at the input face 31 of device 30 may be thought of as being fanned.

It should be appreciated, that due to such fanning different groups of spectrogram's lines impinge the input faces of the several bundles along corresponding directions. Along each bundle the lines are spaced apart in a direction which forms the angle $\theta$ with respect to X'. However, by making the length of each bundle along X' relatively short and since $\theta$ is generally quite small, e.g. on the order of 10°, the height H of each bundle along axis Y' need not be much greater than that of the height of plate 10 along axis Y. In each bundle the lines propagate through the fiber rods to the bundle's output face. These faces are designated by 32A, 32B, and 32C. In FIG. 3 the bottom edges of these faces are assumed to be aligned along the same line. Thus, the lines 41-49 of spectrogram appear on essentially a rectangularly shaped surface of height H (along Y') and width W (along X') where $W = W_A + W_B + W_C$ with the lines being parallel to axis Y' and space apart along axis X'.

With such an arrangement, the height dimension of the active surface 36 of imaging device 35 can be held to be equal to H. That is, the surface 36 need only be high enough to insure that all the lines impinge on light sensitive cells thereon. Since device 35 is tilted as previously explained the lines 41-49 impinge thereon in a direction perpendicular to its axis X' and parallel to its height axis Y'. Thus, its array of cells, arranged in the orthogonal geometry, can be used directly without modification to produce output signals corresponding to the spectrogram's lines.

It should be pointed out that since the fiber optic device 30 is formed of several bundles it is possible that a single spectrogram line, e.g. lines 47, may impinge on two fanned bundles, e.g. B and C. The image of such a line at the output faces 32B and 32C of the bundles will appear to be slightly sheared (in the Y' axis). Similarly a sheared image will be produced on the active surface 36 of the imaging device 35. However, this shear can be accommodated by having active elements on surface 36 high enough to accommodate for the shear displacement.

In one embodiment actually reduced to practice the fiber optics device was formed from commercially available fiber bundles of 0.070 inch square cross-section, each bundle having over 100,000 fiber rods. 42, 2-inch lengths were cut with groups of 3, 2-inch lengths butted together with suitable adhesive to form 14 rectangularly shaped subassemblies each 0.070×0.210 by 2 inches in length. The 14 subassemblies each corresponding to a bundle were then held in a jig and were fastened together with the adhesive, with their input faces fanned and their output faces in the orthogonal geometry as shown in FIG. 3.

If desired after the bundles are fastened together their input and output faces may be cut so that all the input and output faces of all the bundles lie in common spaced apart planes. That is all the input faces lie in one plane and the output faces lie in another spaced apart parallel plane.

Figure 3:
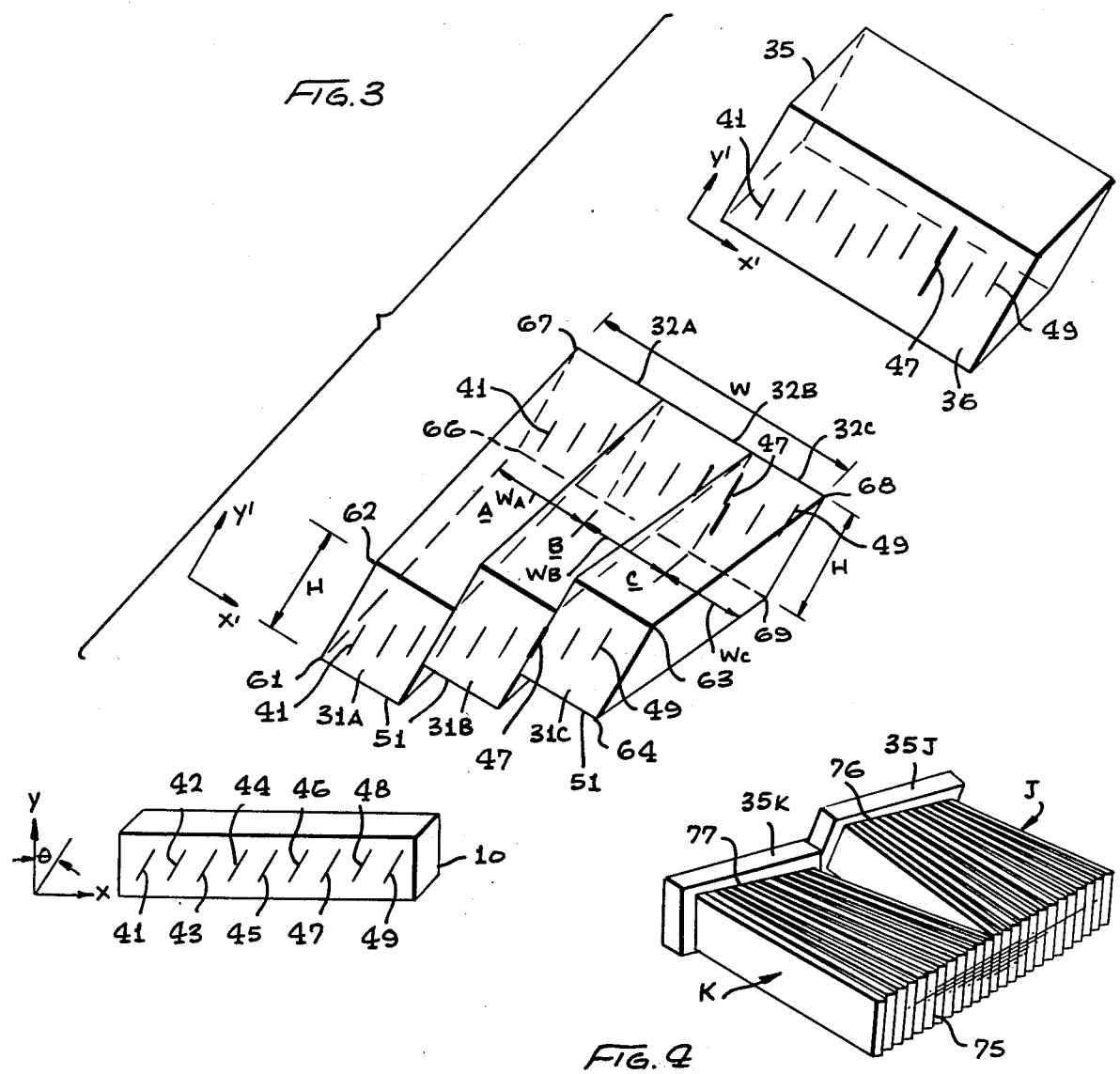

Considering the extreme corners of the front face 31 of device 30, which in FIG. 3 are designated by 61-64 they in a sense define the four corners of a parallelogram, while the corresponding four corners 66-69 of output face 32 define the four corners of a rectangle.

It should be appreciated that the number of bundles heretofore shown as three, is presented for explanatory purposes only. The actual number may be considerably greater. The number is dictated by the length of the spectrogram, the tilt angle and the actual height of the lines.

Some spectrograms are on the order of tens of cm. long. For example, as stated in the above-referred to U.S. Pat. '084 the spectrogram may be about 36 cm. long. Clearly to straighten out the tilt in such a spectrogram the width (along X') of device 30 as well as that of device 35 have to be on the same order. At present conventional imaging devices with orthogonal geometry are considerably shorter, having a width on the order of 2-3 cm. Thus, several such devices may have to be placed side by side.

Figure 5:
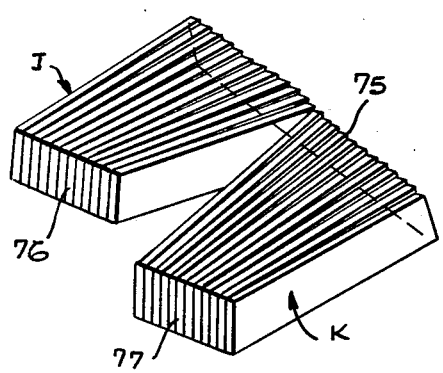

Preferrably the device 30 may consist of several sets of bundles whose input and output faces are cut so that their input faces form one continous parallelogram. Shaped input face, as shown in FIGS. 4 and 5, while their faces are spaced apart, so that separate imaging devices may be placed against them. In FIGS. 4 and 5 two sets of bundles designated J and K, are shown. Their combined input faces are designated by 75 and their separate output faces by 76 and 77, respectively. In FIG. 4 two separate imaging devices 35J and 35K, associated with bundle sets J and K, respectively are shown. FIG. 5 is similar to FIG. 4 except that it is viewed from the output faces 76 and 77 of bundle-sets J and K.

In summary, the present invention comprises a fiber optic device capable of producing spaced apart parallel output images which are perpendicular to one axis (X') and parallel to another orthagonal axis (Y') from input images which though spaced apart and parallel to one another, impinge on the device's input face in directions which are neither parallel nor perpendicular to either to these axes.

Figure 6:
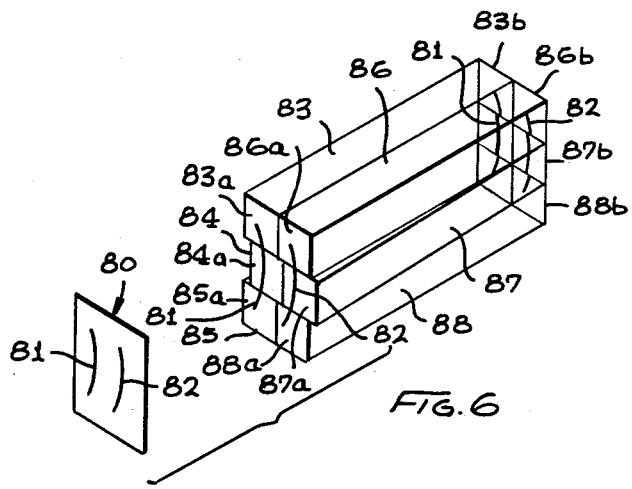
FIG. 6 is an isometric view of yet another embodiment of the invention.

The present invention may also be employed to correct for the curvature in spectrogram lines, known as the Berry curvature. A spectrogram 80 with such curved lines is shown in FIG. 6. Therein, only 2 lines 81 and 82 are shown. These lines may be straightened out by fiber optic bundles 83-88 whose input ends 83a—88a are arranged as shown in FIG. 6 while their output ends 83b—88b are in a rectangular geometry as shown. Basically with the lines' curvature to the right the input face of bundle 84 is offset to the right with respect to bundles 83-85. Similarly, the input face of bundle 87 is offset with respect to those of bundles 86 and 88. However, since the output faces of these bundles are aligned, even though curved line 81 impinges on the input faces of bundles 83-85, at their output faces the line 81 appears nominally straight. Likewise, curved line 82, which impinges the input faces of bundles 86-88, is straightened out and appears as a straight line at the output faces of these bundles.

Although particular embodiments of the invention have been described and illustrated herein, it is recognized that modification and variations may readily occur to those skilled in the art, and consequently, it is intended that the claims be interpreted to cover such modifications and equivalents.

What is claimed is:

1. For use with a source, from which spaced apart parallel light images emanate, said images being neither parallel nor perpendicular to either of two orthogonal axes of said source, optic means having an input face to which said images from said source are directed, and a substantially rectangularly shaped output face, extending along first and second orthogonal axes, said optic means comprising fiber optic elements, each with a longitudinal axis along a straight line, arranged between said input and output faces for providing, in response to the images from said source which impinge said input face, images at said output face which are spaced apart and parallel to said first axis and perpendicular to said second axis.

2. The optic means as recited in claim 1 wherein the images from said source are parallel image lines which are tilted at a preselected angle, definable as $\theta$, with respect to the source's vertical axis, with the fiber optic elements of said optic means being tilted so that the first axis of said output face is tilted by angle $\theta$ with respect to said source's vertical axis and said elements at said input face are arranged in bundles which are fanned, with the extreme corners of the elements at said input defining the four corners of a parallelogram.

3. The optic means as recited in claim 1 wherein said source is a source of a spectrogram with images characterized by Berry curvature, and said elements are arranged in bundles differently positioned at the input and output faces so that every curved image from said source impinges on elements at the input face which are arranged in a curved geometry, but which are arranged at the output face in a straight line geometry.

4. For use with a source from which spectrogram light images emanate, said images being tilted by an angle $\theta$ with respect to a vertical axis of said spectrogram which is orthogonal to the length axis of said spectrogram, optic means comprising a plurality of bundles of fiber optic elements each having a center along a straight line extending from a front face on which some of the images from said source impinge to an opposite output face, the input faces of said bundles being fanned so that the bundles' centers extend along a line which is perpendicular to the spectrogram's vertical axis, with respect to which the images are tilted by the angle $\theta$, and their centers at the output face extend along a line with respect to which the images at the output faces are perpendicular.

5. For use with a source from which spectrogram light images emanate, said images being characterized by Berry curvature, optic means comprising a plurality of bundles of fiber optic elements, each having a center extending along a straight line from an input face to an output face, the bundles being divided into groups wherein the centers of the bundles in each group at their input faces are arranged along a curved geometry, corresponding to the Berry curvature, and the centers of the bundles of each corresponding group are arranged in a straight line geometry.

* * * * *